United States Patent [19]

Angehrn et al.

[11] Patent Number: 5,276,656
[45] Date of Patent: Jan. 4, 1994

[54] METHOD FOR FLUID IDENTIFICATION AND EVALUATION WITHIN WELLBORES USING ULTRASONIC SCANNING

[75] Inventors: Jorg A. Angehrn, Brea; Charles F. Magnani, Placentia, both of Calif.

[73] Assignee: Chevron Research and Technology Company, San Francisco, Calif.

[21] Appl. No.: 881,942

[22] Filed: May 12, 1992

Related U.S. Application Data

[62] Division of Ser. No. 515,388, Apr. 27, 1990, Pat. No. 5,138,585.

[51] Int. Cl.$^5$ .............................................. G01V 1/40
[52] U.S. Cl. ................................... 367/86; 73/155
[58] Field of Search ............ 367/27, 69, 86; 73/155, 73/861.25, 151, 153

[56] References Cited

U.S. PATENT DOCUMENTS

| 4,571,693 | 2/1986 | Birchak et al. | 73/151 |
| 5,031,467 | 7/1991 | Rambow | 73/861.25 |

OTHER PUBLICATIONS

Taylor, T. J., "Interpretation and Application of BHTV Surveys," SPWLA 24th Ann. Logging Symposium, Jun. 27-30, 1983.

Broding, R. A., "Volumetric Scanning Well Logging," SPWLA 22nd Ann. Logging Symposium, Jun. 23-26, 1981.

*Primary Examiner*—Ian J. Lobo
*Attorney, Agent, or Firm*—W. K. Turner; E. A. Schaal

[57] ABSTRACT

The flow of bubbles in a borehole within an active well is determined by using data from a borehole televiewer. A known discontinuous material is introduced into the borehole at a known distance from the borehole televiewer, and the elapsed time is determined between introduction and detection of the discontinuous material by the borehole televiewer.

1 Claim, 1 Drawing Sheet

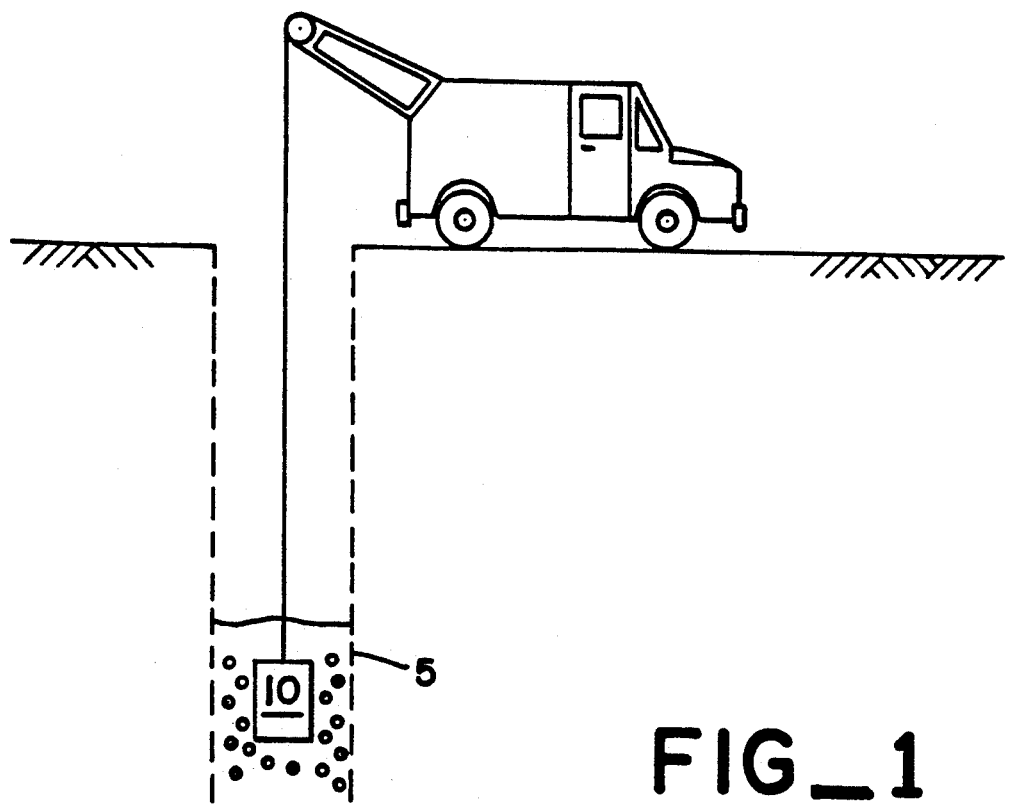
FIG_1
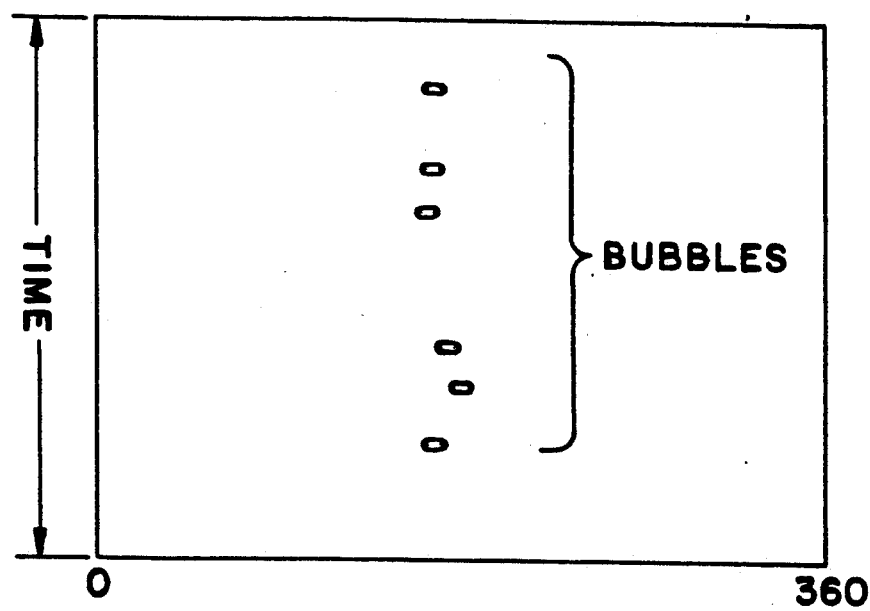
SONIC FLOW LOG
FIG_2

METHOD FOR FLUID IDENTIFICATION AND EVALUATION WITHIN WELLBORES USING ULTRASONIC SCANNING

This is a divisional of U.S. patent application Ser. No. 515,388, filed Apr. 27, 1990, which issued as U.S. Pat. No. 5,138,585 on Aug. 11, 1992.

The present invention relates to using data from a borehole televiewer in an active well to determine fluid properties.

BACKGROUND OF THE INVENTION

Multiphase flow conditions complicate production log surveys and their subsequent evaluation. Conventional production log sensors used for fluid identification (nuclear density, gradiomanometer, and capacitance) typically fail or become inaccurate in high water-cut environments. For example, capacitance probes become unreliable when the in-situ water fraction or holdup exceeds 40%; i.e., the signal is at best qualitative and not quantitatively reliable in locating oil. Density tools such as the gradiomanometer fail when oil density is high (close to water density), the oil fraction is low, and water fraction (holdup) is high. In such cases the gradiomanometer cannot sense oil.

SUMMARY OF THE INVENTION

The present invention involves using data from a borehole televiewer in an active well to determine fluid properties.

An image is formed from echo amplitudes returned from the casing wall. During logging, bubbles moving between the tool's transducer and the casing wall appear as dark areas (low signal), allowing detection of discontinuous phase fluid movement and its direction. Stationary measurements permit monitoring the holdup fraction of the discontinuous phase as a function of time. Under ideal conditions, the ratio between dark and light areas on the image is proportional to the volume ratio of the two phases present.

The present invention is an alternative method for identifying and quantifying the oil fraction (oil holdup) flowing within a high water fraction (water holdup) environment. This invention permits identification and quantification of the volume fraction of a discontinuous phase in a continuous phase: i.e., oil in water, gas in oil, gas in water. It can be used to improve conventional production log evaluation since it provides for in-situ flow visualization of a discontinuous phase in wellbores. In-situ flow visualization can provide clues as to flow regime, flow direction, and discontinuous phase flow volume. When the discontinuous phase is oil, flow visualization may indicate oil crossflow and wellbore fluid migration.

In one embodiment, it involves determining the wall effects from the data, and factoring out those wall effects from the data to determine the fluid properties. Preferably, the borehole televiewer is stationary. For instance, the wall effects can be determined from the data by determining the maximum amplitude values recorded for each beam position of a circumferential scan of the wall. In that case, the fluid properties can be determined from the amplitude data by calculating the ratio of average to maximum amplitude values recorded for each beam position of a circumferential scan of the wall. Preferably, a collapsible reflector is used as a substitute wall.

In a second embodiment, it involves using data from a borehole televiewer with multiple scanner sections in a borehole to determine fluid properties. The elapsed time is determined between similar scan images on each scanner. In that embodiment, the televiewer can either be stationary or move at a known speed. Preferably, a known discontinuous material is introduced into the borehole.

In a third embodiment, it involves introducing into the borehole a known discontinuous material at a known distance from the borehole televiewer, and determining the elapsed time between injection and detection of the material by the borehole televiewer.

In a fourth embodiment, it involves using pattern recognition technology to locate and analyze bubbles.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

FIG. 1 is a schematic drawing of a borehole televiewer within the borehole of an active well.

FIG. 2 is an image produced from data recorded by the borehole televiewer.

DETAILED DESCRIPTION OF THE PREFERRED EMBODIMENTS

In its broadest aspect, the present invention is a method of using data from a borehole televiewer in an active well to determine fluid properties.

Typically a borehole televiewer is run in open holes to scan the formation face for applications such as fracture identification, thin-bed analysis, locating vugs and cavities, and stratigraphic interpretation. The televiewer has been used in cased wells for casing inspection; such as identification of holes, corrosion, scale, etc.

The present invention results from studies of the propagation of ultrasound energy through two- and three-phase fluid systems. We have demonstrated that the televiewer can be used to monitor fluid flow within wellbores. Specifically, flow of a discontinuous phase such as oil in water can be monitored and evaluated.

An acoustic impedance contrast exists between fluids of different density; i.e., oil/water, gas/water, gas/oil, and oil/gas/water. When ultrasonic energy is transmitted through a multiphase medium, an echo will be returned to the transducer if the interface between the phases is normal to the ultrasound beam. This would occur if an ultrasonic beam were propagated across an interface such as a gas/oil contact or an oil/water interface that occurs during horizontal segregated, stratified fluid flow.

We have observed that bubble surfaces create impedance contrasts. In this case the bubble surface will scatter ultrasonic energy and no echo will return to the transducer. When ultrasonic energy is propagated through a single-phase uniform fluid with no interface, the signal will propagate until it reaches a boundary or surface; i.e., casing or borehole wall. It is then reflected back to the transducer. Understanding the impedance contrast and echo characteristics of fluid/fluid interfaces, bubble surfaces relative to single, continuous phase signal characteristics has given rise to a new application of the borehole televiewer to monitor flow of discontinuous phase fluid (such as oil) in a continuous phase (such as water).

Numerical values for the liquid holdup are determined by digitizing the echo amplitude and time of flight and by using an algorithm designed to yield the liquid holdup while reducing the effects of noise. Scale and corrosion on the casing wall produce background noise, introducing significant errors in the ratio calculation. Stationary logging measurements are used to provide input to the algorithm required for correction. Calibration parameters allow the conversion of the volume ratio into estimated flow rates.

FIRST EMBODIMENT

In a first embodiment, this method comprises determining the wall effects from that data, and factoring out those wall effects from the data to determine the fluid properties.

By "active well," we mean a borehole containing two or more immiscible fluids, a liquid and solid particles, or a liquid and a gas, one of which is moving axially with respect to the other along the borehole axis.

By "wall effects," we mean the attenuation of the ultrasonic echo being returned to the transducer which is caused by a rough wall. This roughness may by due to rugose rock or, in a cased well, corrosion or scale buildup on the casing wall. A borehole televiewer properly centered in a smooth casing will receive echoes of identical amplitude from the entire circumferential scan. By "fluid properties," we mean:
1. The characteristic velocity of the sound in a fluid. This measurement allows the detection of oil/water interfaces or fluid levels in a well.
2. The uniformity of the fluid in the path of the beam. Gas bubbles or bubbles of a fluid with different acoustic impedance than the main phase will cause dispersion of the beam and result in a lower amplitude of the echo.

Preferably, the borehole televiewer is stationary By being stationary, the borehole televiewer can be used to monitor changes in the fluid traversed by the ultrasonic beam. While the tool is stationary, the wall effect is constant, affecting the echo amplitude for a given transducer position in the same way on every scan.

One way of determining wall effects from the data by determining the maximum amplitude values recorded for each beam position of a circumferential scan of the wall. In other words, a stationary tool operating in a single phase fluid would register a characteristic amplitude of the echo at every position of the transducer during a circumferential scan. These are the maximum amplitudes that can be obtained at this location. If a second fluid, the minor phase, is introduced into the path of the beam, a drastic reduction of the echo amplitude occurs. Under bubble flow conditions (discontinuous second phase), the probability of recording maximum amplitudes for each transducer position increases with increasing recording time.

For instance, the fluid properties can be determined from the amplitude data by calculating the ratio of average to maximum amplitude values recorded for each beam position of a circumferential scan of the wall. In other words, the sum of the maximum amplitudes per scan is calculated, giving an indication of the wall effect (WE). Similarly, the sum of the measured amplitudes for a given scan in the image (MA) is obtained and an indicator for the volume of the second phase (VS) as a function of time is estimated as follows:

$$VS = k*(1-MA/WE)$$

k is a proportionality constant. The data can be thought of as an image or 2-dimensional array A[n,m], consisting of m scans or lines and n samples (A) per scan.

An array of maximum values Amax[n] is obtained by testing all the scans in the image and extracting the largest amplitudes (A) at a given beam position [i] (i=1. . . n). The wall effect WE is the sum of the samples (Amax). The sum (MA) of the measured amplitudes is obtained by adding all the samples in a given scan.

Preferably, the wall effects are determined from the data by use of a collapsible reflector as a substitute wall. In other words, data is collected by using a circular, collapsible reflector serving as a substitute wall. This arrangement reduces the magnitude of the wall effects or measurement error and consequently the required correction in the measurement.

SECOND EMBODIMENT

In a second embodiment, the borehole televiewer is composed of multiple scanner sections of known distance apart. That borehole televiewer is used in a borehole to determine fluid properties by measuring the elapsed time between similar scan images on each scanner.

That borehole televiewer produces images from each of the scanners which are tagged by time measurements. One can obtain the time lag of a fluid bubble moving past the scanners by correlating the images and estimate the velocity of the bubble from the time lag and the distance between the scanners. That televiewer is either stationary or it moves at a known speed.

Preferably, a known discontinuous material is introduced into the borehole. That discontinuous material can be introduced by either ejecting the material at a known time from a reservoir located either above or below the scanner section, depending on the expected movement of the major phase, of the fluid or the fluid in the well can be converted into a gaseous phase by a sparker means. The sparker means is an electrode to which electrical energy of sufficient power is applied to effect the conversion of the fluid. For this purpose, the fluid must be capable of conducting electrical current.

THIRD EMBODIMENT

In a third embodiment, the data from a borehole televiewer is used to determine fluid properties by introducing into the borehole a known discontinuous material at a known distance from the borehole televiewer, and determining the elapsed time between injection and detection of the material by the borehole televiewer.

More specifically, small amounts of a second phase fluid or solid particles may be injected at the surface at determined time intervals and pumped into the well. The material is detected by the borehole televiewer and the time of its arrival is measured either above a perforated zone or at several locations in between multiple perforated zones.

FOURTH EMBODIMENT

In the fourth embodiment, amplitude data from a stationary borehole televiewer in an active well is used to determine fluid properties by using pattern recognition technology to locate and analyze bubbles. In that embodiment, each bubble of the second phase fluid is detected on the time-tagged image and its diameter estimated based on the appearance of the bubble on the image. The volume of the fluid contained in the bubble is calculated and the total flow of the second phase fluid is estimated based on the integrated bubble volumes and the elapsed time.

Referring to FIG. 1, borehole televiewer 10 is stationary within active borehole 5. As bubbles pass the televiewer, they are logged by the televiewer. FIG. 2 shows a photograph of such a flow log.

While the present invention has been described with reference to specific embodiments, this application is intended to cover those various changes and substitutions which may be made by those skilled in the art without departing from the spirit and scope of the appended claims.

What is claimed is:

1. A method of using data from a borehole televiewer in a borehole in an active well to determine flow of bubbles within said well comprising:
   (a) introducing into said borehole a known discontinuous material at a known distance from said borehole televiewer, and
   (b) determining the elapsed time between introduction and detection of the discontinuous material by the borehole televiewer.

* * * * *